US010190658B2

(12) United States Patent
Della Fiora et al.

(10) Patent No.: US 10,190,658 B2
(45) Date of Patent: Jan. 29, 2019

(54) CABLE TRACK

(71) Applicant: Hewlett Packard Enterprise Development LP, Houston, TX (US)

(72) Inventors: Troy A. Della Fiora, Spring, TX (US); Joseph Allen, Tomball, TX (US); Kevin Labbe, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/564,807

(22) PCT Filed: Apr. 24, 2015

(86) PCT No.: PCT/US2015/027571
§ 371 (c)(1),
(2) Date: Oct. 6, 2017

(87) PCT Pub. No.: WO2016/171725
PCT Pub. Date: Oct. 27, 2016

(65) Prior Publication Data
US 2018/0112739 A1 Apr. 26, 2018

(51) Int. Cl.
*F16G 13/16* (2006.01)
*H02G 15/22* (2006.01)
*H02G 3/04* (2006.01)

(52) U.S. Cl.
CPC .......... *F16G 13/16* (2013.01); *H02G 3/0475* (2013.01); *H02G 15/22* (2013.01)

(58) Field of Classification Search
CPC ......... F16G 13/16; A62C 23/04; A44B 21/00; H02G 15/22

USPC ........................................................ 59/78.1
See application file for complete search history.

(56) References Cited

U.S. PATENT DOCUMENTS

| 4,006,875 | A | * | 2/1977 | Smith | F16G 13/16 138/110 |
| 4,988,838 | A | * | 1/1991 | Kirtland | F16G 13/16 191/12 C |
| 5,220,779 | A | * | 6/1993 | Tatsuta | F16G 13/16 248/49 |
| 5,240,209 | A |   | 8/1993 | Kutsch |  |
| 5,497,536 | A | * | 3/1996 | Hart | F16L 3/015 24/459 |
| 5,642,612 | A | * | 7/1997 | Hughes | F16G 13/16 248/49 |

(Continued)

FOREIGN PATENT DOCUMENTS

KR    10-2010-0099834    9/2010

OTHER PUBLICATIONS

Gannon, M.; "Cable Carrier Design Guidelines"; Dec. 10, 2013, 3 pages.

*Primary Examiner* — David B Jones
(74) *Attorney, Agent, or Firm* — Hewlett Packard Enterprise Patent Department

(57) ABSTRACT

Example implementations relate to a cable track. For example, a cable track includes a plurality of pivotally-connected multi-channel links. Each of the multi-channel links may be a unitary body. A first channel may be located between a first outer member and a dividing member of the multi-channel link. A second channel may be located between a second outer member and the dividing member of the multi-channel link.

18 Claims, 8 Drawing Sheets

(56) References Cited

U.S. PATENT DOCUMENTS

| | | | | |
|---|---|---|---|---|
| 5,890,357 A * | 4/1999 | Blase | ............... | H02G 11/006 |
| | | | | 248/51 |
| 5,900,586 A * | 5/1999 | Carr | ............... | A47B 21/06 |
| | | | | 174/95 |
| 6,070,742 A | 6/2000 | McAnally | | |
| 6,176,072 B1 * | 1/2001 | Weber | ............... | F16G 13/16 |
| | | | | 248/49 |
| 6,459,037 B2 * | 10/2002 | Muller | ............... | F16G 13/16 |
| | | | | 174/19 |
| 6,460,812 B1 | 10/2002 | Jette | | |
| 6,695,014 B2 * | 2/2004 | Blase | ............... | F16G 13/16 |
| | | | | 138/120 |
| 6,708,480 B1 * | 3/2004 | Wehler | ............... | F16G 13/16 |
| | | | | 248/49 |
| 6,997,412 B2 | 2/2006 | Komiya | | |
| 7,240,477 B1 * | 7/2007 | Dunfee | ............... | F16G 13/16 |
| | | | | 248/49 |
| 7,576,283 B2 | 8/2009 | Kadrnoska | | |
| 7,600,719 B2 | 10/2009 | Wehler | | |
| 2002/0118943 A1 | 8/2002 | Solheid et al. | | |
| 2004/0195832 A1 | 10/2004 | Ikeda et al. | | |
| 2010/0058728 A1 | 3/2010 | Pfeifer et al. | | |
| 2013/0025252 A1 | 1/2013 | Harada | | |

* cited by examiner

CABLE TRACK

BACKGROUND

Cable tracks may be used in an electronic device to support and protect wires and cables in an electronic device. A cable may be inserted through the cable track, and then a connector may be installed on the cable. The cable track, with cable installed therein, may be installed to a chassis of the electronic device using screws or brackets.

BRIEF DESCRIPTION OF THE DRAWINGS

Various examples will be described below with reference to the following figures.

DETAILED DESCRIPTION

Cable tracks (also referred to as cable management tracks or cable carriers) may be used in a chassis of an electronic device, such as a server, a workstation, or other computing devices, to support and protect wires and cables in the electronic device. During assembly of the chassis (or the electronic device generally), cables, such as ribbon-style signal cables and/or power cables, are fed through the cable track before connectors are installed on the cables, due to the connectors generally being too large to feed through the cable track. Then, the cable track with cables installed therein may be secured to the chassis using screws and/or brackets and the appropriate hand tools (e.g., screw drivers, wrenches, etc.). However, power cables and signal cables may be bundled together in the same cable track, which may result in cross talk and interference on the cables. Additionally, if a cable fails, the cable track is disassembled from the chassis and the entire cable and cable track is replaced. Accordingly, a cable track including a plurality of pivotally connected unitary multi-channel links that define a first channel separated from a second channel may be useful for quick installation and replacement of cables with preassembled connectors and for separating power and signal cables to avoid interference and cross talk.

Figure 1:
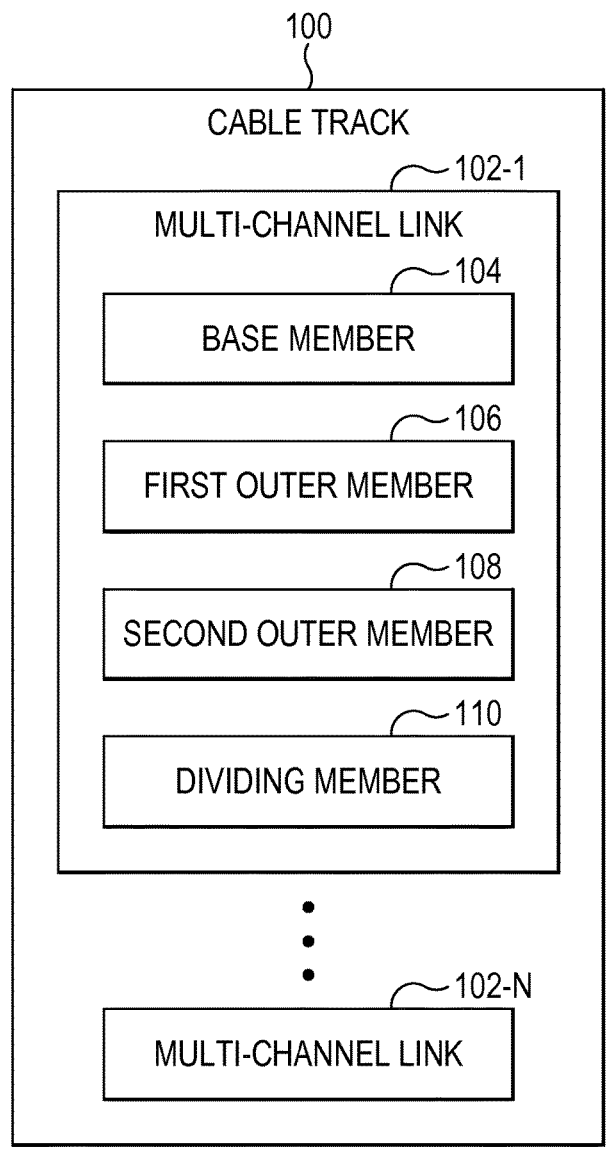
FIG. 1 is a block diagram of an example cable track according to an implementation.

Referring now to the figures, FIG. 1 is a block diagram of an example cable track 100 according to an implementation. The cable track 100 may include a plurality of multi-channel links (e.g., 102-1 through 102-N) pivotally connected to each other (that is, connected by or on pivots). A multi-channel link may also be referred to as a "link". Each of the multi-channel links 102-1 through 102-N may be a unitary body. In some implementations, each multi-channel link (e.g., 102-1) includes a base member 104, a first outer member 106 transversely disposed at a first end portion of the base member 104, a second outer member 108 transversely disposed at a second end portion of the base member 104, and a dividing member 110 transversely disposed on the base member 104 between the first outer member 106 and the second outer member 108. A first channel 112 may be located between the first outer member 106 and the dividing member 110. A second channel 114 may be located between the second outer member 108 and the dividing member 110.

Figure 2:
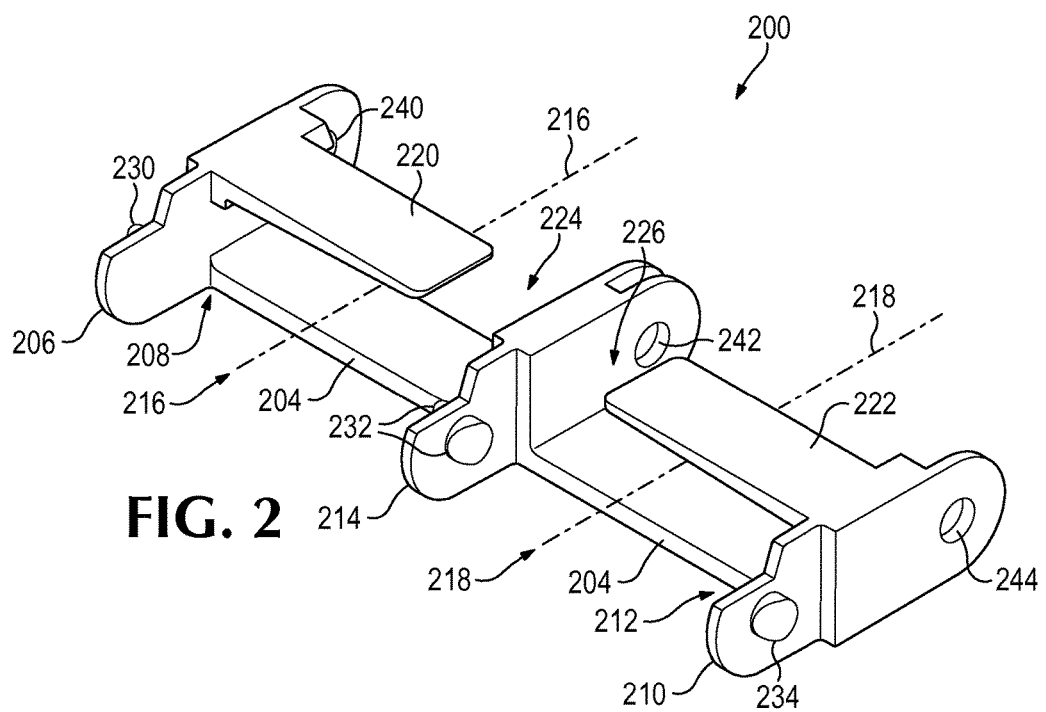
FIG. 2 is an illustration of an example multi-channel link of a cable track according to an implementation.

FIG. 2 is an illustration of an example multi-channel link 200 of a cable track according to an implementation. In some implementations, each of the multi-channel links 102-1 through 102-N of the cable track 100 of FIG. 1 may be analogous to the multi-channel link 200 of FIG. 2. As with each of the multi-channel links 102-1 through 102-N, the multi-channel link 200 may be a unitary body. In other words, the aspects of the multi-channel link 200 described below (with reference numerals) may be integrated aspects of the multi-channel link 200. In some implementations, the multi-channel link 200 may be manufactured as a unitary body by injection molding, 3D printing, or other suitable manufacturing techniques, in contrast to being assembled from separate components.

In some implementations, the multi-channel link 200 may include a base member 204, a first outer member 206, a second outer member 210, and a dividing member 214. The first outer member 206 may be transversely disposed at a first end portion 208 of the base member 204. The second outer member 210 may be transversely disposed at a second end portion 212 of the base member 204. The dividing member 214 may be transversely disposed on the base member 204 between the first outer member 206 and the second outer member 210. A first channel 216 (depicted symbolically as a dashed line in FIG. 2) may be located between the first outer member 206 and the dividing member 214. A second channel 218 (depicted symbolically as a dashed line in FIG. 2) may be located between the second outer member 210 and the dividing member 214. Accordingly, in some implementations, the multi-channel link 200 includes at least two channels. In some implementations, the multi-channel link 200 may be symmetrical about the dividing member 214. In particular, the first outer member 206 and the second outer member 210 may include the same or similar features and may be mirror images of one another.

In some implementations, the multi-channel link 200 may include arms (e.g., 220, 222), which may also be referred to as retaining arms, extending toward the dividing member 214 from each of the first outer member 206 and the second outer member 210. For example, as illustrated in FIG. 2, an arm 220 extends from the first outer member 206 towards the dividing member 214, and an arm 222 extends from the second outer member 210 towards the dividing member 214. In some implementations, a cable-loading opening 224 may be defined between the arm 220 and the dividing member 214, and a cable-loading opening 226 may be defined between the arm 222 and the dividing member 214. In some implementations, the arms 220, 222 may instead extend from the dividing member 214 towards the first outer member 206 and the second outer member 210, respectively, in which case, cable-loading openings may be defined between the arm 220 and the first outer member 206 and between the arm 222 and the second outer member 210.

Figure 6:
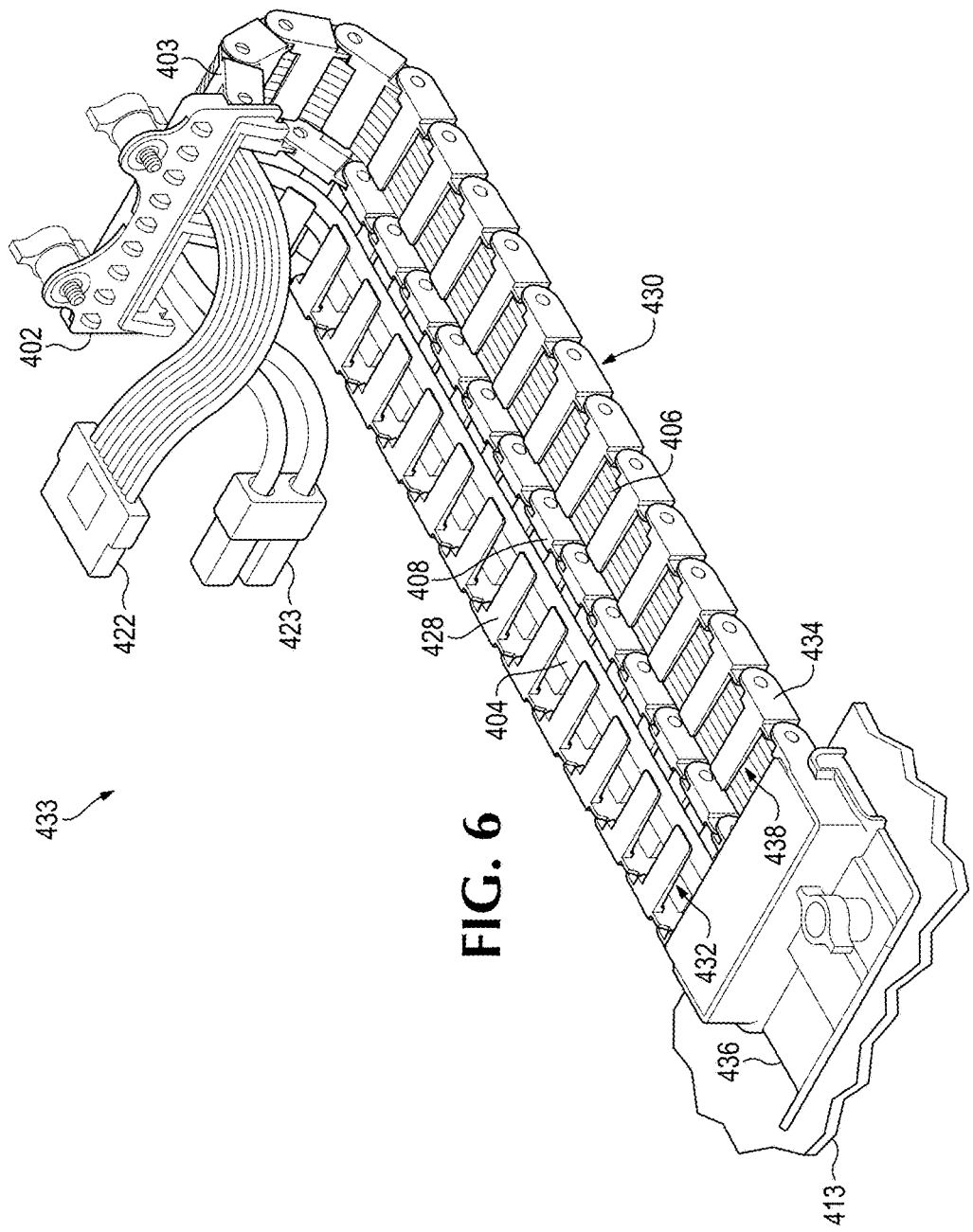
FIG. 6 is an illustration of an example cable track system according to an implementation.

In some implementations, the first channel 216 may be to receive a power cable (not shown in FIG. 2) through a first opening (i.e., cable-loading opening 224) adjacent to the arm 220 (also referred to as a first retaining arm), and the second channel 218 may be to receive a signal cable (not shown in FIG. 2) through a second opening (i.e., cable-loading opening 226) adjacent to the arm 222 (also referred to as a second retaining arm). The power cable and signal cable are illustrated in FIG. 6, and will be described further herein below. Because the first channel 216 and the second channel 218 may be separated by the dividing member 214, the power cable and the signal cable also may be separated by the dividing member 214.

In some implementations, each of the first outer member 206, the second outer member 210, and the dividing member 214 may include at least one male connecting element at an end portion (e.g., a proximal end of each member) and at least one female connecting element at an opposite end portion (e.g., a distal end of each member). For example, the first outer member 206 may include a male connecting element 230 and a female connecting element 240, the second outer member 210 may include a male connecting element 234 and a female connecting element 244, and the dividing member 214 may include a male connecting element 232 and a female connecting element 242. In some implementations, the female connecting element (240, 242, 244) may be an aperture extending through the member (206, 214, 210, respectively). In some implementations, the male connecting element (230, 232, 234) may be a post, and more particularly, a post having a tapered head for laterally sliding into the female connecting element of an adjacent multi-channel link. In some implementations, the male connecting member 232 on the dividing member 214 may be double-sided, that is, it may project from both sides of the dividing member 214. In some implementations, the female connecting elements may be to rotatably mate with a male connecting element of an adjacent multi-channel link, as will be described further herein below with respect to FIG. 3.

Figure 3:
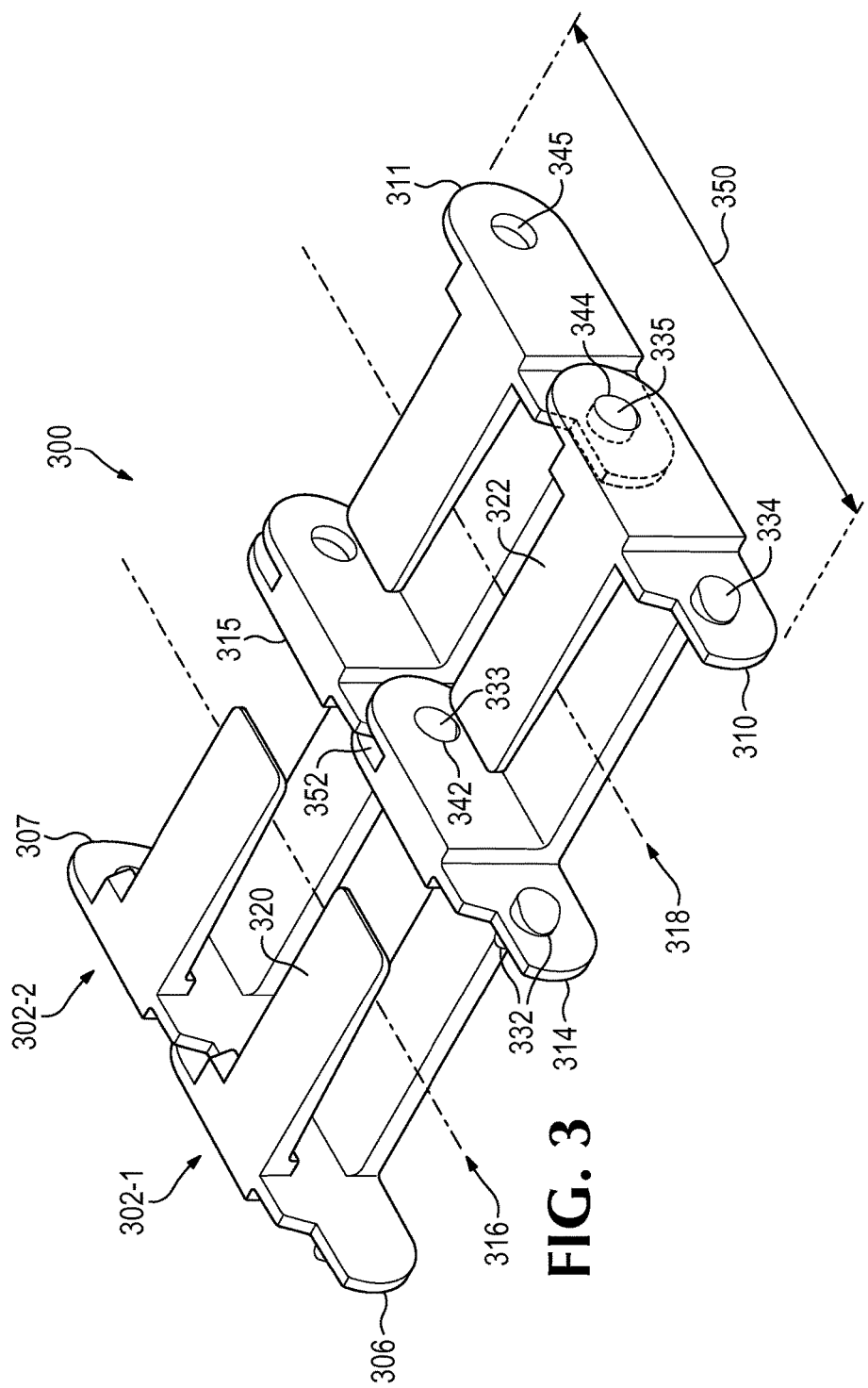
FIG. 3 is an illustration of an example plurality of multi-channel links of a cable track according to an implementation.

FIG. 3 is an illustration of an example cable track 300 having a plurality of multi-channel links 302-1, 302-2, according to an implementation. The cable track 300 may include a first channel 316 and a second channel 318 (both are depicted symbolically as a dashed line in FIG. 3). The first channel 316 may be located between a first outer member 306 and a dividing member 314 and may be partially covered by a first retaining arm 320. The second channel 318 may be located between a second outer member 310 and the dividing member 314 and may be partially covered by a second retaining arm 322. The first outer member 306, the second outer member 310, the dividing member 314, the first retaining arm 320, and the second retaining arm 322 may be integral with a unitary multi-channel link 302-1.

In some implementations, the multi-channel links 302-1 and 302-2 may be analogous in many respects to the multi-channel link 200 of FIG. 2. For example, the multi-channel link 302-1 may include a first outer member 306, a second outer member 310, a dividing member 314, a first channel 316, a second channel 318, and arms 320, 322, which may be respectively analogous to the first outer member 206, the second outer member 210, the dividing member 214, the first channel 216, the second channel 218, and arms 220, 222 of multi-channel link 200. Additionally, pivotally connecting a plurality of multi-channel links 200 of FIG. 2 may be accomplished in a manner similar to that for pivotally connecting multi-channel links 302-1 and 302-2, which will now be described.

In some implementations, the plurality of multi-channel links 302-1, 302-2 may be pivotally connected to one another. A length of the first channel 316 and a length of the second channel 318 may be defined by a quantity of the multi-channel links that are pivotally connected in series. For example, the example cable track 300 illustrated in FIG. 3 includes two multi-channel links 302-1, 302-2, resulting in a length 350 for both the first channel 316 and the second channel 318. However, it should be understood that additional multi-channel links may be pivotally connected to the multi-channel links 302-1, 302-2, which may increase the length 350 of the first channel 316 and the second channel 318.

In some implementations, a particular multi-channel link and an adjacent multi-channel link may be pivotally connected by virtue of a female connecting element of the particular multi-channel link being rotatably mated to a male connecting element of the adjacent multi-channel link. To illustrate the mating of connecting elements, an illustration will now be described with reference to the second outer member 310 of the multi-channel link 302-1 and a second outer member 311 of the multi-channel link 302-2. The second outer member 310 of the multi-channel link 302-1 includes a female connecting element 344, which may be an aperture, and more particularly, a circular or cylindrical aperture, that extends through the second outer member 310 (see also analogous female connecting element 345 of multi-channel link 302-2). The second outer member 311 of multi-channel link 302-2 includes a male connecting element 335, which may be a post, and more particularly, a circular or cylindrical post (see also analogous male connecting element 334 of multi-channel link 302-1). To connect the multi-channel links 302-1 and 302-2, the male connecting element 335 may be mated to and fit inside the female connecting element 344. By virtue of the male connecting element 335 and the female connecting element 344 being circular or cylindrical, the multi-channel links 302-1 and 302-2 may pivot about the mated connecting elements 335, 344 and furthermore, the cable track 300 including a plurality of connected multi-channel links may be articulated.

Additionally, in some implementations, a male connecting element (e.g., 334, 335) may be a post with a tapered head. For example, in some implementations, the male connecting elements 334, 335 may be shaped like a sliced cylinder or cylindrical segment (i.e., a cylinder cut by an angled plane), or as a cylindrical wedge (i.e., a cylinder cut by an angled plane passing through the cylindrical base). By virtue of having a tapered head, the male connecting element 335 may be to slide laterally into the female connecting element 344 with low resistance, and adjacent multi-channel links 302-1, 302-2 thus may be manually snapped together. To slide laterally may refer to a motion in a direction substantially perpendicular to an axis (e.g., a cylindrical axis) of the female connecting element 344 (e.g., aperture) or of the male connecting element 335 (e.g., post). In some implementations, multi-channel links may be removably connected to each other. For example, the multi-channel link 302-2 may be removed from multi-channel link 302-1 by separating the male connecting element 335 from the female connecting element 344.

In some implementations, the first outer member of a multi-channel link (e.g., first outer member 306 of multi-channel link 302-1) may be analogous to and a mirror image of the second outer member of the multi-channel link (e.g., second outer member 310 of multi-channel link 302-1), and mating of a female connecting element (view obstructed in FIG. 3) on a first outer member 306 of multi-channel link 302-1 to a male connecting element (view obstructed in FIG.

3) on a first outer member 307 of adjacent multi-channel link 302-2 may be similar to that described above for mating the female connecting element 344 of multi-channel link 302-1 to the male connecting element 335 of multi-channel link 302-2.

In some implementations, an end portion of the dividing member 314 (e.g., a proximal end) may include a male connecting element 332, and more particularly, the male connecting element 332 may be double-sided, that is, projecting from both sides of the dividing member 314. As with the male connecting elements 334, 335, the male connecting element 332 may have tapered heads. An opposite end portion of the dividing member 314 (e.g., a distal end) may include a slot 352 for receiving a dividing member 315 of the adjacent multi-channel link 302-2, for example, in a tab-and-slot or sandwiched configuration. Additionally, the opposite end portion (distal end) of the dividing member 314 may include a female connecting element 342, which may be in the form of an aperture (like female connecting element 344), for receiving the male connecting element 333 of the dividing member 315 of the multi-channel link 302-2. Owing at least in part to the slot 352 of dividing member 314 receiving the dividing member 315, the connection between multi-channel links 302-1 and 302-2 may be stable and/or robust.

Figure 4:
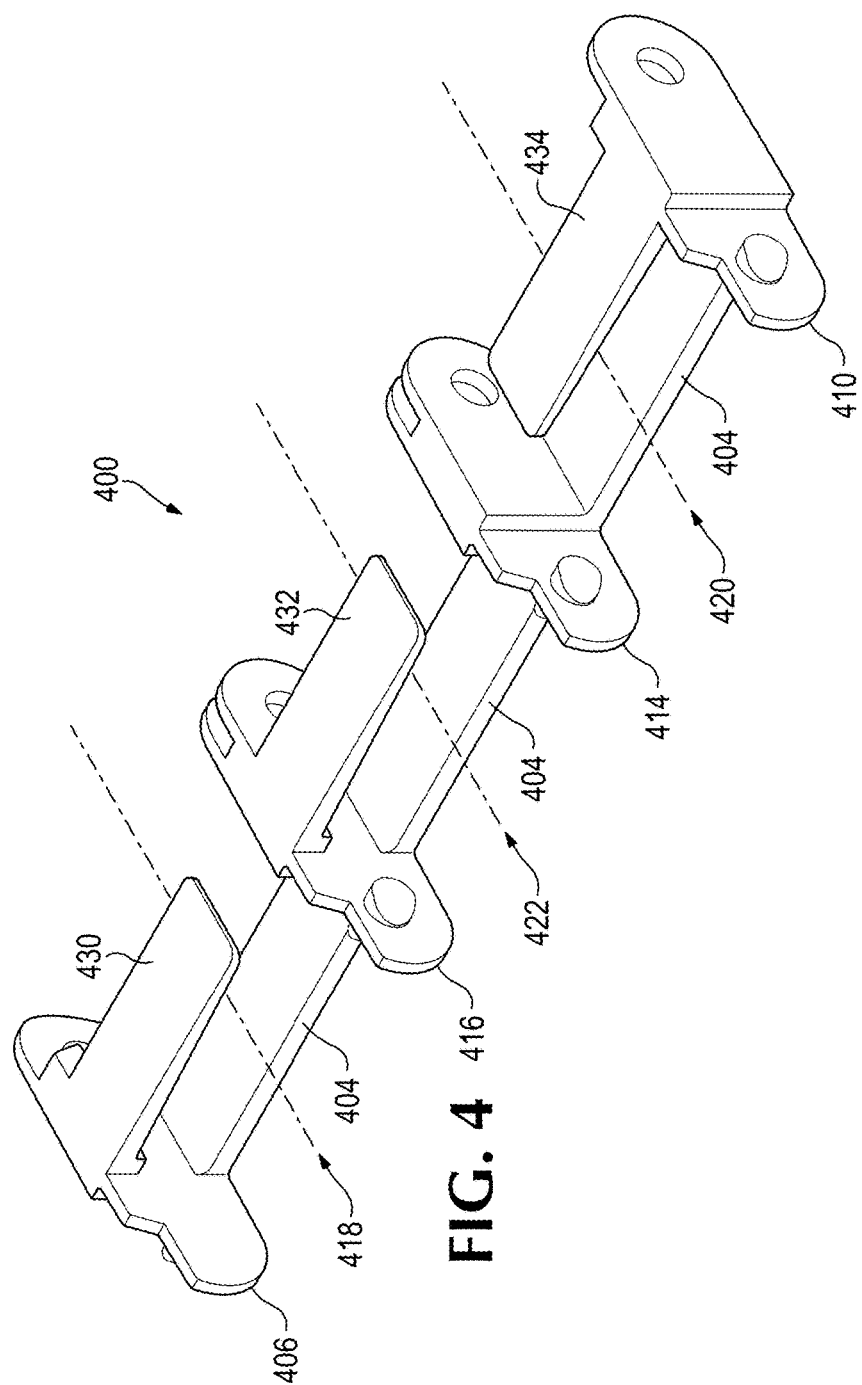
FIG. 4 is an illustration of an example multi-channel link of a cable track according to an implementation.

FIG. 4 is an illustration of an example multi-channel link 400 of a cable track according to an implementation. Multi-channel link 400 may be analogous to the multi-channel link 200 in many respects. For example, multi-channel link 400 may include a base member 404, a first outer member 406, a second outer member 410, a dividing member 414, a first channel 418, a second channel 420, an arm 430 extending from the first outer member 406, and an arm 434 extending from the second outer member 410, which may be respectively analogous to the base member 204, the first outer member 206, the second outer member 210, the dividing member 214, the first channel 216, the second channel 218, the arm 220, and the arm 222 of multi-channel link 200 of FIG. 2.

The multi-channel link 400 may include additional dividing members (at least one additional dividing member, e.g., 416) transversely disposed on the base member 404 between the first outer member 406 and the second outer member 410. Additional channel(s) (e.g., channel 422) may thus be located between adjacent dividing members 414, 416. In other words, a cable track that includes the multi-channel link 400 may include at least one additional channel 422 between the first channel 418 and the second channel 420, the at least one additional channel 422 being located between adjacent dividing members 414, 416 of a plurality of dividing members 414, 416, the plurality of dividing members 414, 416 including the dividing member 414. In some implementations, the additional dividing member 416 may include an arm 432 (extending towards adjacent dividing member 414) to partially cover the additional channel 422. Although one additional dividing member 416 and one additional channel 422 are illustrated in the example multi-channel link 400, it should be understood that any number of additional dividing members and corresponding channels may be included in some implementations.

Figure 5:
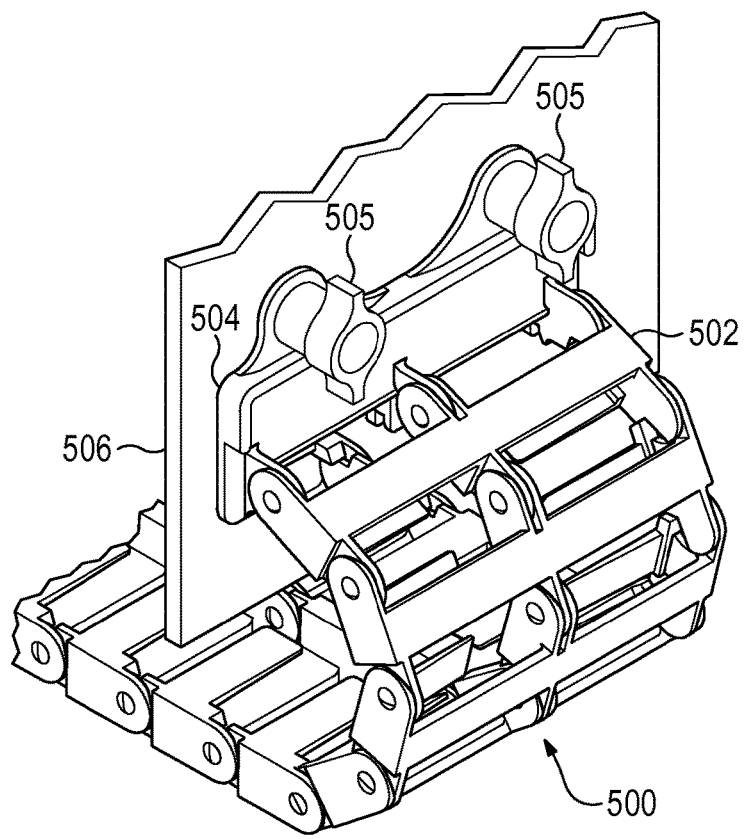
FIG. 5 is an illustration of an example chassis connector of a cable track according to an implementation.

FIG. 5 is an illustration of an example chassis connector 504 of a cable track 500 according to an implementation. The chassis connector 504 may be pivotally connected to an end link 502 of the cable track 500. The end link 502 may be analogous to the multi-channel links 200, 302-1, 302-2 described above, and thus may include a first channel and a second channel. In some implementations, the end link 502 may be deemed a terminal portion of the first channel and the second channel of the cable track 500. In some implementations, as shown in FIG. 5, the chassis connector 504 may include male connecting elements for mating (rotatably) to female connecting elements of the end link 502. Alternatively, in some implementations, the chassis connector 504 may include female connecting elements for mating (rotatably) to male connecting elements (not shown) of the end link 502.

The chassis connector 504 may be connectable to a chassis 506. In some implementations, the chassis 506 may be for receiving electronic devices (not shown), such as computing devices, server components, and the like. More particularly, in some implementations, the chassis connector 504 may be tool-less, such that the chassis connector 504 may be secured, affixed, attached or removed from the chassis 506 manually, without the use of a screwdriver, wrench, socket, or other tool. For example, in some implementations, a tool-less chassis connector 504 may be manually secured to the chassis 506 by way of tool-less screw fasteners 505. Other types of tool-less fasteners may be utilized in some implementations, such as cam levers, rivet fasteners, and the like.

FIG. 6 is an illustration of an example cable track system 600 according to an implementation. The cable track system 600 may include a cable track 601. The cable track 601 may include a plurality of multi-channel links, each of which may be analogous to the multi-channel links, 200, 302-1, 302-2 described above with respect to FIGS. 2 and 3. The multi-channel links of the cable track 601 may define a first channel 602 and a second channel 604 separated by a dividing member 614 of each multi-channel link. The cable track 601 may also include a first tool-less chassis connector 608 pivotally connected to a first link 606 of the plurality of multi-channel links and a second tool-less chassis connector 612 pivotally connected to a last link 610 of the plurality of multi-channel links. In other words, a tool-less chassis connector (e.g., 608 or 612) may be pivotally connected to a terminal portion (e.g., at the first link 606 or the last link 610, respectively) of the first channel 602 and the second channel 604. A chassis 630 for receiving electronic devices (not shown), such as computing devices, server components, and the like, may be connected to the first tool-less chassis connector 608. Additionally or alternatively, the chassis 630 may be connected (not shown) to the second tool-less chassis connector 612. In some implementations, the second tool-less chassis connector 612 as illustrated in FIG. 6 may be analogous to the chassis connector 504 of FIG. 5.

In some implementations, the cable track 601 (or more generally, the cable track system 600) may also include a power cable 616 arranged in the first channel 602 and a signal cable 618 arranged in the second channel 604, and the power cable 616 and the signal cable 618 may be separated by the dividing member 614 of each multi-channel link. It should be understood that in some implementations, the power cable 616 may be arranged in the second channel 604 and the signal cable 618 may be arranged in the first channel 602. In a manner similar to that described above with respect to FIG. 2, the power cable 616 may be inserted (laterally or lengthwise) into first channel 602 through openings at each multi-channel link between a retaining arm 624 and the dividing member 614. The signal cable 618 also may be inserted (laterally or lengthwise) through similar openings at each multi-channel link into the second channel 604. In some implementations, the power cable 616 may include a power cable connector (or terminator) 620 and the signal cable 618 may include a signal cable connector (or terminator) 622. The power cable 616 and the signal cable 618 may be to connect to the electronic devices received by chassis 630. By virtue of separating the power cable 616 and the signal cable 618, cross talk and interference between the cables may be reduced or avoided.

Owing at least in part to the openings at each multi-channel link (e.g., between the arm 624 and the dividing member 614), a power cable 616 preassembled with connector 620 and a signal cable 618 preassembled with connector 622 may be inserted into or removed from the first channel 602 and second channel 604, even if the connectors 620 and 622 are larger in size than the first channel 602 and second channel 604. Additionally, by virtue of the cable track 601 being adjustable in length by adding and removing multi-channel links (as described above with respect to FIG. 3), a cable track 601 may be assembled to accommodate the length(s) of the power cable 616 preassembled with connector 620 and/or a signal cable 618 preassembled with connector 622.

Figure 7:
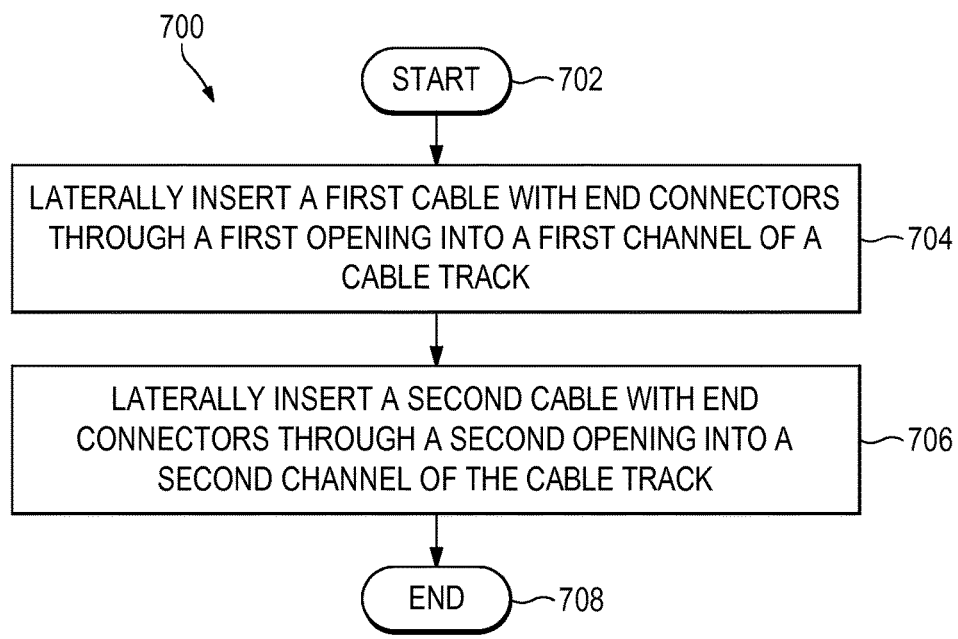
FIG. 7 is an example method for sliding cables with end connectors into a cable track according to an implementation.

FIG. 7 is a flowchart of an example method 700 for sliding cables with end connectors into a cable track. In some implementations of the present disclosure, one or more blocks of method 700 may be executed substantially concurrently or in a different order than shown in FIG. 7. In some implementations of the present disclosure, method 700 may include more or less blocks than are shown in FIG. 7. In some implementations, one or more of the blocks of method 700 may, at certain times, be ongoing and/or may repeat. The method 700 is described below with reference to the cable track system 600 of FIG. 6, although other cable tracks and multi-channel links described herein also may be suitable for performing method 700.

The method 700 begins at block 702, and at block 704, a first cable (e.g., 616) may be laterally inserted (e.g., lengthwise) with end connectors (e.g., 620) through a first opening into a first channel (e.g., 602) of a cable track (e.g., 601). At block 706, a second cable (e.g., 618) with end connectors (e.g. 622) may be laterally inserted (e.g., lengthwise) through a second opening into a second channel (e.g., 604) of the cable track (e.g., 601). The cable track (e.g., 601) includes a plurality of pivotally-connected multi-channel links, each of the multi-channel links defining the first channel (e.g., 602) at least in part between a first outer member and a dividing member, and defining the second channel (e.g., 604) at least in part between a second outer member and the dividing member. The method 700 may end at block 708.

Figure 8:
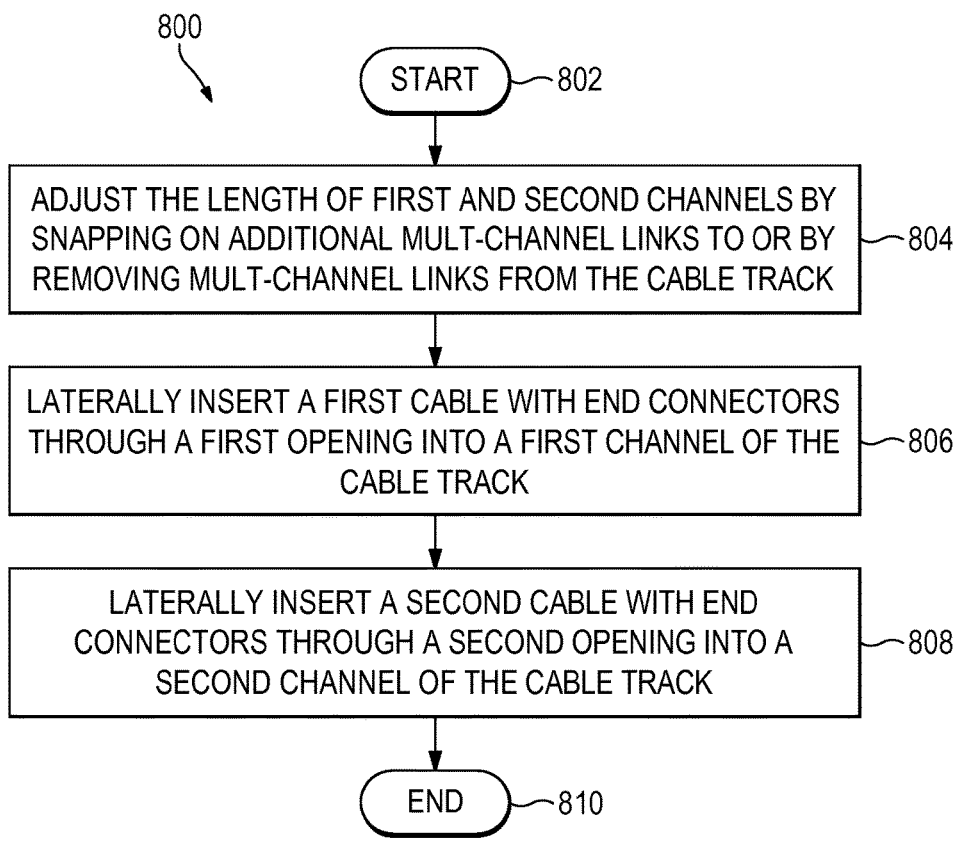
FIG. 8 is an example method for adjusting the length of a cable track according to an implementation.

FIG. 8 is a flowchart of an example method 800 for adjusting the length of a cable track. In some implementations of the present disclosure, one or more blocks of method 800 may be executed substantially concurrently or in a different order than shown in FIG. 8. In some implementations of the present disclosure, method 800 may include more or less blocks than are shown in FIG. 8. In some implementations, one or more of the blocks of method 800 may, at certain times, be ongoing and/or may repeat. The method 800 is described below with reference to the cable track system 600 of FIG. 6, although other cable tracks and multi-channel links described herein also may be suitable for performing method 800.

The method 800 begins at block 802, and at block 804, the length of the first channel and the second channel may be adjusted by snapping on additional multi-channel links to the plurality of pivotally-connected multi-channel links or by removing multi-channel links from the plurality of pivotally-connected multi-channel links. At block 806, a first cable (e.g., 616) may be laterally inserted (e.g., lengthwise) with end connectors (e.g., 620) through a first opening into a first channel (e.g., 602) of a cable track (e.g., 601). At block 808, a second cable (e.g., 618) with end connectors (e.g. 622) may be laterally inserted (e.g., lengthwise) through a second opening into a second channel (e.g., 604) of the cable track (e.g., 601). The method 800 may end at block 810.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. A cable track comprising:
a plurality of multi-channel links pivotally connected to each other, wherein each of the multi-channel links is a unitary body and includes:
a base member,
a first outer member transversely disposed at a first end portion of the base member,
a second outer member transversely disposed at a second end portion of the base member, and
a dividing member transversely disposed on the base member between the first outer member and the second outer member, a first channel being located between the first outer member and the dividing member and a second channel being located between the second outer member and the dividing member;
a first tool-less chassis connector pivotally connected to a first link of the plurality of multi-channel links;
a second tool-less chassis connector pivotally connected to a last link of the plurality of multi-channel links; and
a chassis for receiving electronic devices connected to the first tool-less chassis connector or the second tool-less chassis connector.

2. The cable track of claim 1, further comprising a power cable arranged in the first channel and a signal cable arranged in the second channel, the power cable and the signal cable being separated by the dividing member.

3. The cable track of claim 1, wherein each of the multi-channel links includes arms extending toward the dividing member from each of the first outer member and the second outer member, cable-loading openings being defined between the arms and the dividing member.

4. The cable track of claim 1, wherein the multi-channel links are removably connected to each other.

5. The cable track of claim 1, wherein each of the first outer member, the second outer member, and the dividing member includes at least one male connecting element at an end portion and at least one female connecting element at an opposite end portion, the female connecting element to rotatably mate with a male connecting element of an adjacent link.

6. The cable track of claim 5, wherein
the female connecting element is an aperture extending through the member, and
the male connecting element is a post having a tapered head for laterally sliding into the female connecting element of an adjacent link.

7. The cable track of claim 1, further comprising additional dividing members transversely disposed on the base member between the first outer member and the second outer member, additional channels being located between adjacent dividing members.

8. A cable track comprising:
a first channel located between a first outer member and a dividing member and partially covered by a first retaining arm;
a second channel located between a second outer member and the dividing member and partially covered by a second retaining arm; and
a tool-less chassis connector pivotally connected to a terminal portion of the first channel and the second channel,
wherein the first outer member, the second outer member, the dividing member, the first retaining arm, and the second retaining arm are integral with a unitary multi-channel link, and
a length of the first channel and a length of the second channel are defined by a quantity of multi-channel links pivotally connected in series.

9. The cable track of claim 8, wherein
the first channel is to receive a power cable through a first opening adjacent to the first retaining arm,
the second channel is to receive a signal cable through a second opening adjacent to the second retaining arm, and
the power cable and the signal cable being separated by the dividing member.

10. The cable track of claim 8, wherein a female connecting element of a particular multi-channel link is rotatably mated to a male connecting element of an adjacent multi-channel link so that the particular multi-channel link body and the adjacent multi-channel link are pivotally connected.

11. The cable track of claim 8, further comprising at least one additional channel between the first channel and the second channel, the at least one additional channel being located between adjacent dividing members of a plurality of dividing members, the plurality of dividing members including the dividing member.

12. A method comprising:
providing a cable track comprising:
a first channel located between a first outer member and a dividing member and partially covered by a first retaining arm,
a second channel located between a second outer member and the dividing member and partially covered by a second retaining arm, and
a tool-less chassis connector pivotally connected to a terminal portion of the first channel and the second channel,
wherein the first outer member, the second outer member, the dividing member, the first retaining arm, and the second retaining arm are integral with a unitary multi-channel link and
a length of the first channel and a length of the second channel are defined by a quantity of multi-channel links pivotally connected in series;
laterally inserting a first cable with end connectors through a first opening adjacent to the first retaining arm and into the first channel of a cable track; and
laterally inserting a second cable with end connectors through a second opening adjacent to the second retaining arm and into the second channel of the cable track.

13. The method of claim 12, further comprising adjusting the length of the first and second channels by snapping on additional multi-channel links to the plurality of pivotally-connected multi-channel links or by removing multi-channel links from the plurality of pivotally-connected multi-channel links.

14. The method of claim 12, wherein the end connectors of the first cable are larger than the first channel, and the end connectors of the second cable are larger than the second channel,
the first cable is a power cable, and
the second cable is a signal cable.

15. The method of claim 12, further comprising providing an additional channel between the first channel and the second channel, the additional channel being located between adjacent dividing members of a plurality of dividing members and being partially covered by an additional retaining arm.

16. The method of claim 15, further comprising laterally inserting an additional cable with end connectors through an opening adjacent to the additional retaining arm and into the additional channel.

17. The cable track of claim 1, further comprising:
a first cable arranged in the first channel, the first cable being preassembled with end connectors that are larger than the first channel; and
a second cable arranged in the second channel, the second cable being preassembled with end connectors that are larger than the second channel.

18. The cable track of claim 9, wherein the power cable or the signal cable includes end connectors larger than the first channel and the second channel.

* * * * *